United States Patent
Berthold et al.

(10) Patent No.: US 9,090,719 B2
(45) Date of Patent: Jul. 28, 2015

(54) POLYETHYLENE COMPOSITION AND FINISHED PRODUCTS MADE THEREOF

(75) Inventors: Joachim Berthold, Grassau (DE); Bernd Lothar Marczinke, Römerberg (DE); Diana Doetsch, Mainz (DE); Iakovos Vittorias, Mainz (DE); Dieter Lilge, Limburgerhof (DE); Heinz Vogt, Frankfurt (DE); Johannes-Gerhard Müller, Leinach (DE)

(73) Assignee: Basell Polyolefine GmbH, Wesseling (DE)

( * ) Notice: Subject to any disclaimer, the term of this patent is extended or adjusted under 35 U.S.C. 154(b) by 748 days.

(21) Appl. No.: 13/375,766

(22) PCT Filed: May 27, 2010

(86) PCT No.: PCT/EP2010/003225
§ 371 (c)(1),
(2), (4) Date: Dec. 7, 2011

(87) PCT Pub. No.: WO2010/139419
PCT Pub. Date: Dec. 9, 2010

(65) Prior Publication Data
US 2012/0108766 A1 May 3, 2012

Related U.S. Application Data

(60) Provisional application No. 61/268,260, filed on Jun. 10, 2009.

(30) Foreign Application Priority Data

Jun. 3, 2009 (EP) .................................... 09007332

(51) Int. Cl.
*C08L 23/06* (2006.01)
*C08F 10/02* (2006.01)
*C08F 10/00* (2006.01)
*C08F 210/16* (2006.01)
*C08L 23/08* (2006.01)

(52) U.S. Cl.
CPC .............. *C08F 10/00* (2013.01); *C08F 210/16* (2013.01); *C08L 23/06* (2013.01); *C08L 23/0815* (2013.01); *C08L 2205/035* (2013.01); *C08L 2207/068* (2013.01); *C08L 2314/02* (2013.01)

(58) Field of Classification Search
CPC . C08L 23/06; C08L 2207/06; C08L 2314/02; C08L 2203/16; C08F 10/02; C08F 2500/05; C08F 2500/07; C08F 2500/12; C08F 2500/26
USPC ....................................... 526/348, 348.6, 352
See application file for complete search history.

(56) References Cited

U.S. PATENT DOCUMENTS

| 4,851,489 A | 7/1989 | Malpass |
| 6,713,561 B1 | 3/2004 | Berthold et al. |
| 7,569,175 B1 | 8/2009 | Nilsen et al. |
| 7,872,071 B2 | 1/2011 | Berthold et al. |
| 8,268,425 B2 | 9/2012 | Vogt et al. |
| 2006/0052542 A1 | 3/2006 | Berthold et al. |
| 2006/0074193 A1 | 4/2006 | Berthold et al. |
| 2006/0074194 A1 | 4/2006 | Berthold et al. |
| 2006/0155058 A1 | 7/2006 | Berthold et al. |
| 2008/0139750 A1 | 6/2008 | Berthold et al. |
| 2008/0166535 A1* | 7/2008 | Berthold et al. .............. 428/220 |
| 2010/0010163 A1 | 1/2010 | Berthold et al. |
| 2011/0171450 A1 | 7/2011 | Berthold et al. |
| 2011/0318559 A1 | 12/2011 | Berthold et al. |
| 2012/0141702 A1 | 6/2012 | Shim et al. |

FOREIGN PATENT DOCUMENTS

| CN | 1376170 A | 10/2002 | |
| CN | 101061150 A | 10/2007 | |
| DE | 10 2005 009 916 A1 * | 9/2006 | .............. C08L 23/04 |
| EP | 0068257 | 4/1985 | |
| EP | 0401776 | 12/1990 | |
| EP | 0532551 | 3/1993 | |
| WO | WO 0114122 A1 | 3/2001 | |
| WO | WO 2009003627 A1 | 1/2009 | |

OTHER PUBLICATIONS

Zimm, Bruno H. et al., "The Dimensions of Chain Molecules Containing Branches and Rings", The Journal of Chemical Physics, vol. 17, No. 12 Dec. 1949 , 1301-1304.

Graessley, William W. , "Effect of Long Branches on the Flow Properties of Polymers", Accounts of Chemical Research, vol. 10 1977 , 332-339.

Z. Grubisic; P. Rempp; H. Benoit, A Universal Calibration for Gel Permeation Chromatography, Polymer Letters, vol. 5, 1967, pp. 753-759.

* cited by examiner

*Primary Examiner* — Rip A Lee

(57) ABSTRACT

Novel polyethylenes having defined molecular weight distribution and LCB structure are devised, for films or moldings.

12 Claims, 1 Drawing Sheet

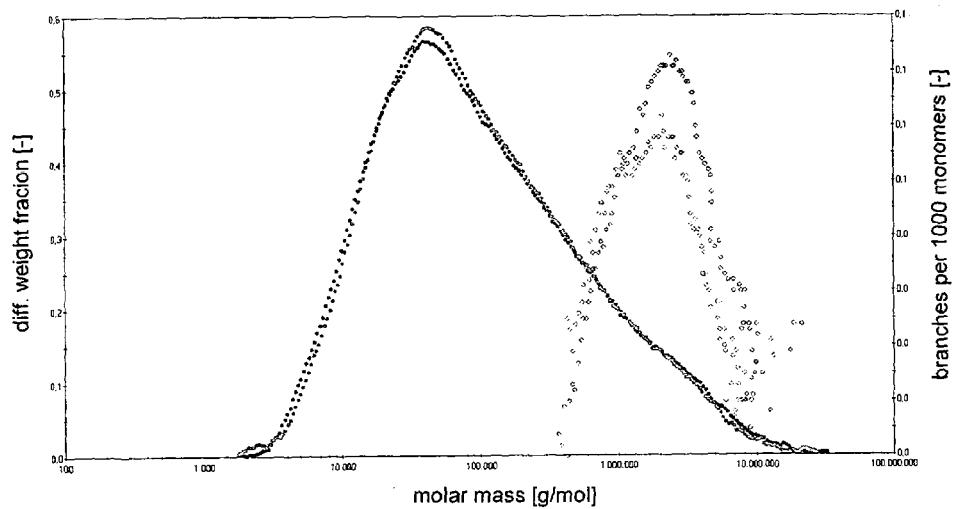

POLYETHYLENE COMPOSITION AND FINISHED PRODUCTS MADE THEREOF

This application is the U.S. national phase of International Application PCT/EP2010/003225, filed May 27, 2010, claiming priority to European Patent Application 09007332.1 filed Jun. 3, 2009 and the benefit under 35 U.S.C. 119(e) of U.S. Provisional Application No. 61/268,260, filed Jun. 10, 2009; the disclosures of International Application PCT/EP2010/003225, European Patent Application 09007332.1 and U.S. Provisional Application No. 61/268,260, each as filed, are incorporated herein by reference.

The present invention relates to novel polyethylene moulding compositions, and films and other mouldings made thereof.

Processability of Ziegler catalyst polyethylene products, due to their complex comonomer distribution and molecular weight distribution, and as possibly manufactured as multimodal reactor blends in different reactions steps, is an object where there is always a need for improvement. It is known that those subfractions of a Ziegler polymer having extremely high molecular weights of above 500,000 g/mol and having long chain branches (LCB) are paramount to the processing behaviour of the whole polymer product; they are often addressed as high molecular weight tail, since constituting a quantitatively relatively minor share of the total polymer and having little impact on the number-average molecular weight Mn. The LCB structure itself, both the branching rate as well as the chain length distribution, strongly modulate account for such impact on processing behaviour, by affecting the extent and strength of entanglements in between the high molecular weight chains. It is known to be a characteristic of Ziegler products (Malpass et al. 1989, U.S. Pat. No. 4,851,489).

However, merely introducing more LCB into Ziegler products by different approaches, such as e.g. adding radical initiators during extrusion or electron beam treatment, did not produce the intended effects and/or not in a reliable fashion. There are two many factors and possibilities to be considered. It is the object of the present invention to devise an improved Ziegler product that, as a direct result of the catalytic process, shows improved processing behaviour.

This object has been solved by the polyethylene compositions of the present invention and the direct, catalytic process for their obtention employing a Ziegler catalyst. It is devised a polyethylene composition having a melt flow rate at 5 kg/190° C. according to ISO 1133:2005 (abbreviated $MI_{5\,kg}$) of from 0.25 to 3 g/10 min, preferably of from 0.3 to 2 g/10 min, more preferably of from 0.31 to 1 g/10 min and/or a Hostalen Processing Index value, hereafter coined Hostalen Index (HI) value for short, of from 0.18 to 18 with the proviso that for $MI_{5kg}$ being >1.9 g/10 min, then the HI value is >1.

BRIEF DESCRIPTION OF THE DRAWINGS

FIG. 1 illustrates molecular weight distribution and long-chain branching distribution (LCB/1000CH$_2$, as a function of molecular weight) as determined from gyration radius by GPC-MALLS for the polymer products of examples 1 and 2.

The compositions according to the present invention typically and preferably have densities of from 0.92 to 0.97 g/cm$^3$, more preferably of from 0.935 to 0.965 g/cm$^3$.

In one preferred embodiment, the polyethylene composition has a HI value of from 1 to 17, more preferably of from 1.1 to 16.5, most preferably of from 2 to 16. This range of products is best suited for film products, inclusive blown and cast film products, and most particular for blown films.

In another preferred embodiment, the polyethylene composition has a HI value of from 0.22 to 10, preferably of from 1.1 to 10. This range of products is best suited for certain film types and/or hollow, form-blown blow mouldings such as e.g. canisters, reservoir tank, bottles or the like.

In another preferred embodiment, alone or in combination with the foregoing ones, the $MI_{5\,kg}$ is of from 0.3 to 2 g/10 min., more preferably is of from 0.33 to 1 g/10 min.

The HI according to the present invention is calculated according to the following equation:

$$HLCBI = \left(\frac{M_z}{M_w}\right)\left(\frac{1}{g_{M_z}}\right)(eh_{at\,0.1s^{-1}} - 0.99)$$

where:

$M_z$ and $M_w$ are the $3^{rd}$ and $2^{nd}$ (or weight-average) moment of the molecular weight distribution, as determined by Gel-Permeation Chromatography coupled with Multi-Angle-Laser-Light-Scattering (GPC-MALLS). A more detailed description of the method can be found in the experimental section. For data recording and computation of the Mz and Mw values from the experimentally obtained distribution curve, commercial GPC software was used (from: hs GmbH, Hauptstraβe 36, D-55437 Ober-Hilbersheim).

$g_{Mz}$ is the branching factor at a molecular weight $M=M_z$. The branching factor is defined for each eluted polymer fraction, as the ratio of the root-mean-square radius of gyration, $\langle R_g^2 \rangle$, of the measured polymer to the rms radius of gyration of a linear PE reference, $\langle R_g^2 \rangle_{linear}$ $$g_M = \frac{\langle R_g^2 \rangle_M}{\langle R_g^2 \rangle_{M,linear}}$$

eh is the elongational hardening of the polymer, for the purposes of the present patent at an uniaxial elongation rate of 0.1 s$^{-1}$ (eh indexed 'at 0.1 s$^{-1}$') and at a test temperature of T=150° C. Elongational or strain hardening in uniaxial elongation is the ratio of the maximum melt elongational viscosity measured at the specific elongation rate, $\eta_{E,max}$, over the linear response at the same time, $\eta_s$. Accordingly, eh is defined as $$eh = \frac{\eta_{E,max}}{\eta_s}$$

The $\eta_{E,max}$, in case no plateau is observed after a certain elongation, can be defined as the maximum polymer melt viscosity value, measured at 10-50 seconds after the start of deformation or at elongations L of the specimen ln(L(t)/L(0))≥3 (based on the definition of 'Hencky strain').

The linear viscoelastic response, $\eta_s$, is calculated from fitting linear rheological data of G' and G" at the same temperature with a multi-mode Maxwell model, calculating the transient shear viscosity and multiplying by 3 (Trouton ratio). The present method and the definition of elongational (strain) hardening is described in Mackosko C. W. Rheology Principles, Measurements and Applications, 1994, Wiley-VCH, New York.

Elongational flow or rheology properties of polymer melts are paramount to processing operations like film blowing, blow moulding and thermoforming. Strain or elongational hardening eh induces a so-called self-healing effect which supports a homogenous deformation of the melt. Thus polymers exhibiting strain hardening in elongational flow improve the production of films and bottles or other mouldings with respect to a homogenous distribution of wall thickness. On the other hand, strain or elongational hardening eh is also responsive to molecular properties of the polyethylene composition otherwise poorly measurable by parameters reflecting the weight of the high molecular weight fraction, such as $M_z$, or the degree of long chain branching such as reflected by the branching factor for the high molecular weight tail weight $M_z$. Conventionally, the skilled person was held to believe that eh is positively correlated to and is dominated by $M_z$ and eventually $g_{Mz}$.

Preferably, the polyethylene composition according to the present invention has a $g_{Mz} > 0.26$, more preferably $>0.28$, most preferably $>0.31$. Preferably, in combination with the foregoing preferred embodiments for $g_{Mz}$, $g_{Mz}$ has a value of less or up to 0.45, more preferably has a value of less or up to 0.40, and preferably, in combination with the foregoing preferred embodiments, always the elongation hardening value eh $>1.2$ s$^{-1}$, more preferably the eh value is at least 1.2 s$^{-1}$, more preferably is at least 1.4 s$^{-1}$, or is above.

More preferably, the polyethylene composition according to the present invention has a $M_z < 3,700,000$ g/mol, more preferably of $<3,400,000$ g/mol, and most preferably of $<3,200,000$. The latter most preferred embodiment is particularly preferred in conjunction with the above given, preferred values for $g_{Mz}$, in particular with $g_{Mz} > 0.31$, and is preferred especially and preferably in conjunction with an eh value of $>1.4$ s$^{-1}$. This illustrates further that a decrease in $M_z$ and a lower degree in long chain branching may surprisingly coincide with an increase in elongational viscosity and hence processing.

The polyethylene or polyethylene composition of the present invention is preferably obtained by polymerisation of ethylene, optionally in the further presence of and with at least one comonomer, by at least one Ziegler catalyst. The comonomer is typically an 1-olefine, preferably it is a $C_4$ to $C_{12}$ 1-olefine such as 1-n-butene, 1-n-octene, 1-n-hexene. More preferably, the polymerization is carried out by a cascaded reactor system at temperatures of from 20 to 120° C., at a pressure in the range of from 2 to 60 bar and in the presence of a Ziegler catalyst as described above, which comprises conducting the polymerization in at least two stages, the molar mass of the polyethylene at a given reactor stage being controlled by dosing hydrogen during the polymerisation. Most preferably, according to the present invention, the polymerization is conducted in three consecutive or cascaded reactor stages, giving rise to a trimodal product in terms of molecular weight distribution.

Such trimodal composition comprising a first (A) low, second (B) high and third (C) ultra-high molecular weight fraction, wherein the peak molecular weights $Mp_x$, with $x=\{A, B \text{ or } C\}$, of said first, second and third molecular weight fractions are $Mp_A < Mp_B < Mp_C$. The fractions A, B, C correspond to the product of the first, second, third reactor stage, preferably and respectively.

It is the surprising realization of the present invention that it is not solely the presence of a high molecular weight tail, having a molecular weight $M_z > 500,000$ g/mol, preferably having a molecular weight $M_z > 1,000,000$ g/mol, most preferably having a molecular weight $M_z > 2,000,000$ g/mol, in a Ziegler product that is decisive for processing properties (as directly assessable by different tests for different applications, e.g. bubble stability for film blowing, or low shear viscosity in general) beside that is relevant for the mechanical, impact properties sought to be achieved. Without wanting to be bound by theory, additional information on the fine-structure of the polymer is furnished by strain hardening in addition to conventional LCB branching factors or similar index systems, and all such properties may well be adjusted surprisingly independently from another. This way, novel polyethylene compositions are devised having new, unprecedented properties. It is possible for instance to obtain films having a higher mechanical impact resistance at 10 μm compared to 20 μm film thickness, as determined by DDI measurement.

Preferably, the Ziegler catalyst is a high-mileage Ziegler catalyst, especially when a cascaded reactor system is used and no new catalyst is feeded to the system when trespassing from one reactor to the next reactor step. According to the present invention, a suitable high-mileage catalyst substantially maintains its specific catalytic activity over a long period of time, that is of from 4 to 8 hours, and is responsive to hydrogen as to allow of modifying the molecular weight distribution of the polymer at the different reactor stages. Specific examples of a catalyst which is suitable in this manner are the Ziegler catalysts cited in EP-532 551, EP-068 257 and EP-401 776. Said documents describe the conversion of Magnesium alcoholates with compounds comprising a transition metal selected from the group consisting of Ti, Zr or Vd and a further metalorganic compound, said metal being selected from the main groups I, II or III of the periodic table. Furthermore, as is well-known in the art, alumorganic cocatalyst species is preferably used for enhancing and sustaining Ziegler catalyst activity during polymerisation; such cocatalysts and their use is described in EP-068 257. More preferably, the cocatalyst according to the present invention is tri-alkylaluminium, with the alkyl being C1 to C10 alkyl, more preferably it being C2 to C6 alkyl which may be branched or linear, most preferably it is triethylaluminium or tripropylaluminium. The use of alumorganic cocatalyst has further been discussed and explained in U.S. Pat. No. 4,851,489. Preferably, when using a cascaded reactor process for manufacturing, intermittent depressurization, e.g. by way of an intermittent flash tank, is applied for changing the hydrogen partial pressure, and optionally or suitably the ethylene partial pressure, at the onset of a new reactor stage, requiring an Mw of the polymer product different from that of the preceding reactor stage.

A process for manufacturing the polyethylene composition according to the present invention is a further object of the present invention, which process comprises polymerizing ethylene and optionally at least one comonomer as described above, in three consecutive reactor steps with at least one Ziegler catalyst, and preferably in the presence of an alumorganic cocatalyst. Preferred embodiments pertaining to conducting such process are further described elsewhere in the description and claims.

The polyethylene composition may further comprise the usual additives such as stabilizers, UV-absorbants, radical scavengers, fillers, processing additives, pigments, plasticizers and the like, preferably up to or less than 10%, more preferably up to or less than 5% by weight of the total composition.

EXPERIMENTS

Analytical Methods a. Elongational Rheology

The measurements were performed on a Physica MCR 301 parallel plate rheometer instrument from AntonPaar GmbH (Graz, Austria), equipped with the Sentmanant Elongational Rheology tool (SER). The measurements were performed at 150° C., after an annealing time of 5 min at the measurement temperature. The measurements were repeated for different specimens of each sample at elongational rates varying between 0.01 s-1 and 10 s-1, typically at 0.01, 0.05, 0.1, 0.5, 1, 5, 10 s-1. For each measurement, the uniaxial elongational melt viscosity was recorded as a function of time.

The test specimens for measurement were prepared as follows: 2.2 g of the material were weighted and used to fill a moulding plate of 70×40×1 mm. The plate was placed in a press and heated up to 200° C., for 1 min, under a pressure of 20-30 bar. After the temperature of 200° C. was reached, the sample was pressed at 100 bar for 4 min. After the end of the compression-time, the material was cooled down to room temperature and the plate was removed from the form from the compressed 1 mm thick compressed polymer plate, rectangular films of 12×11×1 mm were cut off and used as specimens for measuring the elongational hardening.

b.1 GPC for Determination of Molecular Weight Parameters

The determination of the molar mass Mn, Mw (and peak molecular weight Mp, as needed) was carried out by high-temperature gel permeation chromatography using a method described in DIN 55672-1:1995-02 (=issue February 1995). The deviations according to the mentioned DIN standard are as follows: Solvent 1,2,4-trichlorobenzene (TCB), temperature of apparatus and solutions 145° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 connected in series was used. The solvent was vacuum distilled under nitrogen and was stabilized with 0.025% by weight of 2,6-di-tert-butyl-4-methylphenol. The flow rate used was 1 ml/min, the injection was 400 µl and polymer concentration was in the range of 0.008%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., J. Polymer Sci., Phys. Ed., 5, 753(1967)). The Mark-Houwing parameters used herefore were for PS: kPS=0.000121 dL/g, aPS=0.706 and for PE kPE=0.000406 dL/g, αPE=0.725, valid in TCB at 135° C. Data recording, calibration and calculation was carried out using NTGPC_Control_V6.02.03 and NTGPC_V6.4.24 (hs GmbH, Hauptstraβe 36, D-55437 OberHilbersheim), respectively.

GPC-MALLS measurements for determination of Mz were carried out on a PL-GPC C210 instrument on high temperature GPC of Polyethylene under the following conditions: styrene-divinylbenzene column, 1,2,4-trichlorobenzene (TCB) as solvent, flow rate of 0.6 ml/min., at 135° C., with detection by multi-angle-laser light-scattering (MALLS) detector as described in section b.2 in more detail.

b.2—GPC-MALLS Analysis for Determination of Branching Factor g(Mz)

The experimentally determined branching factor g which allows to determine long-chain branches at molecular weight Mz, was measured by Gel Permeation Chromatography (GPC) coupled with Multi-Angle Laser-Light Scattering (MALLS), as described in the following:

The parameter g is the ratio of the measured mean square radius of gyration to that of a linear polymer having the same molecular weight. It is a measure for the presence of long chain branches (LCB) as was shown by the theoretical considerations of Zimm and Stockmeyer (Zimm et al., J. Chem. Phys. 1949, 17, 1301-1314), though there is some mismatch between the experimentally measured branching factor g (sometimes written g', for distinction) and the theoretically deduced one, as described in Graessley, W, Acc. Chem. Res. 1977, 332-339. In the present context, the branching factor g(Mz) is the experimentally determined one.

Linear molecules show a g factor value of 1, while values less than 1 in theory indicate the presence of LCB. Values of g were calculated as a function of molecular weight, M, from the equation:

$$g(M) = <R_g^2>_{sample,M} / <R_g^2>_{linear\,ref.,M}$$

where $<R_g^2>_M$ is the mean-square radius of gyration for the fraction of molecular weight M. The linear reference baseline is internally computated based on the theoretical value of the Zimm-Stockmeyer equation (Zimm et al., J. Chem. Phys. 1949, 17, 1301-1314) for a perfectly linear polymer. The radius of gyration (size of polymers at each fraction coming from GPC) was measured with a Laser (16-angle Wyatt green-laser): for each fraction eluted from the GPC, carried out as described above, the molecular weight M and the branching factor g were determined, in order to define g at a defined M.

A Polymer Laboratories (now Varian, Inc., Essex Road, Church Stretton, Shropshire, SY6 6AX,UK) type 210 high temperature GPC was used, with solvent 1,2,4-trichlorobenzene at 135° C. and at a flow rate of 0.6 mL min$^{-1}$ employing three Shodex UT 806 and one UT 807 columns. Polyethylene (PE) solutions with concentrations of 1 to 5 mg/10 mL, depending on samples, were prepared at 150° C. for 2-4 h before being transferred to the SEC injection vials sitting in a carousel heated at 135° C. The polymer concentration was determined by infrared detection with a PolymerChar IR4 detector as in section b.1 above and the light scattering was measured with a Wyatt Dawn EOS multi angle MALLS detector (Wyatt Technology, Santa Barbara, Calif./U.S.A.). A laser source of 120 mW of wavelength 658 nm was used. The specific index of refraction was taken as 0.104 ml/g. Data evaluation was done with ASTRA 4.7.3 and CORONA 1.4 software (Wyatt, supra). The absolute molecular weight M and radius of gyration $<R_g^2>$ where established by Debye-type extrapolation at each elution volume by means of the aforementioned software. The ratio g(M) at a given molecular weight M was then calculated from the radius of gyration of the sample to be tested and the radius of the linear reference at the same molecular weight. In the present context, the branching factor g(Mz) means g being determined at M=Mz.

c. Impact Resistance Testing

Dart Drop Impact (DDI) testing was carried out according to ASTM D 1709: 2004 Method A, on films having a thickness of either 20 µm or 10 µm as individually annotated with the respective set of data.

d. Complex Viscosity Measurement

Dynamic oscillatory shear deformation and response thereto, was applied on the polymer in a parallel-plate rheometer from Anton-Paar MCR 300 (Anton Paar GmbH, Graz/Austria) for the determination of shear rheology, i.e. measurement of complex viscosity η* at a given frequency ω. Firstly, the sample (from granulate or powder form) is prepared for the measurement as follows: 2.2 g of the material are weighted and used to fill a moulding plate of 70×40×1 mm. The plate is placed in a press and heated up to 200° C., for 1 min. under a pressure of 20-30 bar. After the temperature of 200° C. is reached, the sample is pressed at 100 bar for 4 min. After the end of the press-time, the material is cooled to room temperature and plates are removed from the form. A visual quality control test is performed at the pressed-plates, for possible cracks, impurities or inhomogeneity. The 25 mm diameter, 0.8-1 mm thick polymer discs are cut off from the pressed form and introduced in the rheometer for the dynamic mechanical analysis (or frequency sweep) measurement.

The measurement of the elastic (G') & viscous (G") moduli and of the complex viscosity η* as a function of frequency ω was performed in said Anton Paar MCR300 stress-controlled rotational rheometer. The device is equipped with a plate-plate geometry, i.e. two parallel discs of 24.975 mm radius. The disc sample of ~1 mm thickness and 25 mm diameter, prepared as above, is loaded and heated at the measurement temperature (standard for PE: T=190° C.). The molten sample is kept at the test temperature for 5 min to achieve a homogeneous melting. Thereafter the frequency sweep begins by the instrument taking points between 0.01 and 628 rad/s logarithmically.

A periodic deformation in the linear range with a strain amplitude of 0.05 (or 5%) is applied. Points are chosen from the frequency range logarithmically descending from high frequencies to low. The frequency sweep ranged from 628.3 rad/s (or ~100 Hz) to 8.55 rad/s and for the very low frequency regime continuing from 4.631 rad/s to 0.01 rad/s (or 0.00159 Hz) with an increased rate of sampling, such as that more points are taken for the low frequency range. The resulting shear stress amplitude and the phase lag from the applied deformation are acquired by the instrument and used to calculate the loss and storage moduli and the complex viscosity, as a function of frequency.

e. Miscellaneous Methods

The density [g/cm$^3$] was determined according to DIN EN ISO 1183-1, Method A (Immersion). For measurement, compression moulded plaques (thickness 2 mm) were prepared having a defined thermal history: Press conditions—temperature, pressure and time: 180° C., 200 bar for 8 min, Crystallization in boiling water for 30 min.

The amount of Al, Fe, Mg and Ti in the catalyst was measured by ICP-OES method, according to DIN EN ISO 11885.

Viscosity numbers were directly determined with an Ubelohe capillary viscometer according to ISO 1191::1975 in decaline at a temperature of 135° C.; measurement was carried out on sample of the reactor mixture obtained at the end of the first, second or third polymerization stage.

Synthesis of Ziegler Catalyst & Outline of Polymerization Reaction

As a Ziegler catalyst, the catalyst acc. to exp. 1 of EP-401 776 was produced. The polymerization was conducted in a continuous process in a series of three cascaded slurry reactors. The Ziegler catalyst was added only once, to the first reactor. The Ziegler catalyst (suspended in hexane as indicated) was used with an additional amount of the cocatalyst triethylaluminium in a molar ratio of about 1:10, as indicated below in more details. Flash tanks in between the reactor stages allowed of adjusting the hydrogen, ethylene and comonomer dosage individually for every reactor stage.

Example 1

Catalyst 4.4 [mmol/L]
Catalyst-Dosage: 4.2 [mmol/h]
cocatalyst: TEA, provided at 22.8 [mmol/L]
active Al: 1 [mmol/L]
TEA dosage: 61 [mmol/h]
R1, R2, etc.=slurry reactor No. 1, 2, etc.

TABLE I

| polymerization conditions | | | | |
|---|---|---|---|---|
| | unit | R1 | R2 | R3 |
| Temperature | ° C. | 84 | 84 | 84 |
| pressure | bar | 8.6 | 1.7 | 2.8 |
| Ethylene C2 | kg/h | 38.4 | 25.6 | 16 |
| Ethylene C2-split | % | 48 | 32 | 20 |
| H2 | NL/h | 955 | | 85 |
| H2/C2 | L/kg | 24.9 | | 5.3 |
| Butene C4 | kg/h | | 0.059 | 0.354 |
| Ethylene C2 | Vol. % | 15.2 | 61 | 61.9 |
| H2 | Vol. % | 67.1 | 5.7 | 17.9 |
| Butene C4 | Vol. % | 0.04 | 0.67 | 1.25 |
| p (H2) | bar | 5.3 | 0.059 | 0.37 |
| p (C2) | bar | 1.2 | 0.62 | 1.26 |
| H2/C2 | — | 4.4 | 0.1 | 0.3 |
| Hexane | % | 40 | 59 | |
| PhV (phase ratio gas:liquid/slurry) | — | 2.7 | 3.1 | 4 |
| Viscosity number | cm$^3$/g | 69 | 333 | 357 |
| density | g/cm$^3$ | 0.969 | 0.958 | 0.956 |

The polymer product was separated from hexane, dried and granulated. Blown films were made thereof on an Alpine film blowing line.

Example 2

Catalyst: 8.5 [mmol/L]
Catalyst dosage: 3.6 [mmol/h]
cocatalyst: TEA, provided at 22.8 [mmol/L]
aktives Al: 1.1 [mmol/L]
cocatalyst dosage: 61 [mmol/h]
R1, R2, etc.=slurry reactor No. 1, 2, etc.

TABLE II

| polymerization conditions | | | | |
|---|---|---|---|---|
| | unit | R1 | R2 | R3 |
| Temperature | ° C. | 84 | 84 | 84 |
| pressure | bar | 7.8 | 1.6 | 2.5 |
| Ethylene C2 | kg/h | 38.4 | 25.6 | 16 |
| Ethylene C2-split | % | 48 | 32 | 20 |
| H2 | NL/h | 794 | | 64 |
| H2/C2 | L/kg | 20.7 | | 4 |
| Butene C4 | kg/h | | 0.059 | 0.354 |
| Ethylene C2 | Vol. % | 17 | 71 | 68.2 |
| H2 | Vol. % | 70.3 | 5.6 | 14.4 |
| Butene C4 | Vol. % | 0.05 | 0.5 | 1.38 |
| p (H2) | bar | 4.97 | 0.051 | 0.267 |
| p (C2) | bar | 1.2 | 0.65 | 1.25 |
| H2/C2 | — | 4.1 | 0.1 | 0.2 |
| hexane | % | 40 | 59 | |
| PhV (phase ratio gas:liquid/slurry) | — | 2.7 | 3.1 | 4 |
| Viscosity number | cm$^3$/g | 72 | 415 | 352 |
| density | g/cm$^3$ | 0.97 | 0.959 | 0.956 |

The polymer product was separated from hexane, dried and granulated. Blown films were made thereof on an Alpine film blowing line.

Example 3

Molecular weight distribution (drawn line) and long-chain branching distribution (LCB/1000CH$_2$, as a function of molecular weight) as determined from gyration radius by GPC-MALLS are shown in FIG. 1 for the polymer products of examples 1, 2. The results of film testing are shown in table III below:

TABLE III

| Sample [unit] | MI$_{5kg}$ g/10 min | density g/cm$^3$ | DDI 20 μm g | DDI 10 μm g | DDI increase % from 20 to 10 μm | Elong. Hardening @0.1 s$^{-1}$ | Elong. Hardening @0.01 s$^{-1}$ | Ti g/mol Ti | Al $C_{al}$/(mmol.h$^{-1}$ cat.) |
|---|---|---|---|---|---|---|---|---|---|
| Ex. 1 | 0.31 | 0.955 | 340 | 360 | 5.9 | 1.25 | 3.0 | 1.67 | 0.96 |
| Ex. 2 | 0.33 | 0.955 | 280 | 340 | 21.4 | 1.6 | 3.3 | 1.33 | 0.96 |

Example 4-8

Similar to the polymerization process of examples 1 and 2, further polymer samples 4 to 8 have been produced according to the present invention, by varying the process conditions mildly and obtaining products of different Mw, Mz, HI etc.

Essentially, the process description of example 1 was applied, wherein always the following conditions were varied within the limits indicated:

Polymerization conditions
  Hydrogen-to-ethylene ration in 3$^{rd}$ reactor: 0.2<H$_2$/C$_2$<0.4
  Hydrogen-to-ethylene ratio in 2$^{nd}$ reactor: H$_2$/C$_2$=0.08
  Comonomer in 3$^{rd}$ reactor: 0.8<C$_4$<1.3% vol
  Comonomer in 2$^{rd}$ reactor: 0.5<C$_4$<0.8% vol.
  Alkyl-concentration (Triethylaluminium): 0.96< C$_{Al}$<1.2 mmol/L
  Partial ethylene pressure, P$_{c2}$: <0.65 bar for 2$^{nd}$ and <1.25 bar for 3$^{rd}$ reactor Final resin properties:
  MFI$_{5kg}$=0.35-0.44 g/10 min
  Density, ρ=0.955-0.957 g/cm$^3$
  a DDI for 10 μm films of always >300 g The further properties of the resins obtained from examples 1, 2 and 4-8, in view of HI calculation and melt rheology and their comparison with presently available commercial grades, mostly from competitors, are shown in table IV below.

TABLE IV

| sample | M$_w$ from GPC-MALLS (g/mol) | M$_z$ from GPC-MALLS (g/mol) | M$_z$/M$_w$ from GPC-MALLS (g/mol) | g at M$_z$ (MALLS) | elong. hardening at 0.1 s$^{-1}$ | HI | MFI$_5$ | MFI$_{21,6}$ |
|---|---|---|---|---|---|---|---|---|
| Exp. 1/invention | 444867 | 2646488 | 5.9 | 0.40 | 1.2 | 3.1 | 0.315 | 10.6 |
| Exp. 2/invention | 482887 | 3329116 | 6.9 | 0.32 | 1.6 | 13.1 | 0.336 | 11.338 |
| Exp. 4/invention | 421090 | 3118210 | 7.4 | 0.34 | 1.7 | 15.9 | 0.44 | 14.33 |
| Exp. 5/invention | 447643 | 2822083 | 6.3 | 0.39 | 1.3 | 4.3 | 0.34 | 10.69 |
| Exp. 6/invention | 423470 | 2862298 | 6.8 | 0.37 | 1.2 | 3.8 | 0.4 | 12.1 |
| Exp. 7/invention | 456908 | 3165958 | 6.9 | 0.37 | 1.4 | 7.8 | 0.34 | 11.63 |
| Exp. 8/invention | 507688 | 3599616 | 7.1 | 0.30 | 1.7 | 17.3 | 0.413 | 13.309 |
| Lyondell[1] Alathon L5045/comparative example | 162855 | 1034004 | 6.3 | 0.99 | 1.1 | 0.4 | 2.07 | 46.89 |
| Lyondell[1] Alathon L4434/comparative example | 165044 | 790201 | 4.8 | 1.00 | 1.0 | 0.0 | 1.55 | 29.21 |
| Formosa Taisox 9001/comparative example | 348019 | 2283373 | 6.6 | 0.58 | 1.0 | 0.1 | 0.353 | 13.53 |
| Prime Polymer Japan Haizex 7000F/comparative example | 508244 | 2689956 | 5.3 | 0.32 | 1.0 | 0.2 | 0.214 | 8.46 |
| Dow DGDH-1095NT/comparative example | 96905 | 294241 | 3.0 | 0.97 | 1.1 | 0.3 | 3.19 | 60.2 |
| Basell[2] HS ACP 5331A/comparative example | 402914 | 2290740 | 5.7 | 9.00 | 1.0 | 0.0 | 0.312 | 6.71 |
| Basell[2] Histif 5431Z/comparative example | 555305 | 3479422 | 6.3 | 0.84 | 1.0 | 0.1 | 0.12 | 2.5 |
| Borealis BL0521/comparative example | 315010 | 1233530 | 3.9 | 0.97 | 1.4 | 1.8 | 0.08 | 2.23 |

[1] = which now is LyondellBasell, Europe
[2] = which now is LyondellBasell, North America

The invention claimed is:

1. A polyethylene composition having a melt flow rate at 5 kg/190° C. (MI$_{5kg}$) according to ISO 1133:2005 from 0.25 to 3 g/10 min and a Hostalen Processing Index (HI) value from 0.18 to 18, wherein when the MI$_{5kg}$ is >1.9 g/10 min, then the HI value is >1
wherein the HI is defined as $$HI = \left(\frac{M_z}{M_w}\right)\left(\frac{1}{g_{M_z}}\right)(eh_{at 0.1s^{-1}} - 0.99)$$

where:
$M_z$ is the z-average molecular weight
$M_w$ is the weight-average molecular weight $g_{M_z}$ is the branching factor at a molecular weight $M=M_z$
eh is the elongational hardening of the polymer at a uniaxial elongation rate of 0.1 s$^{-1}$ and at a test temperature of T=150° C., and $$eh = \frac{\eta_{E,max}}{\eta_s}$$

wherein $\eta_{E,max}$ is the maximum melt elongational viscosity measured at the given elongation rate and $\eta_s$ is the linear viscoelastic response,
and wherein the polyethylene composition has a density from 0.950 to 0.97 g/cm$^3$.

2. The composition according to claim 1, wherein the MI$_{5kg}$ is from 0.3 to 2 g/10 min. and/or the HI value is from 0.2 to 10.

3. The composition according to claim 1, wherein the composition is obtained by catalysis with at least one Ziegler catalyst.

4. The composition according to claim 1, wherein the composition has a multi-modal molecular weight distribution.

5. The composition according to claim 4, wherein the composition is trimodal comprising a first (A) low, second (B) high and third (C) ultra-high molecular weight fraction, wherein the peak molecular weights Mp$_x$, with x={A, B or C}, of said first, second and third molecular weight fractions are Mp$_A$<Mp$_B$<Mp$_C$.

6. The composition according to claim 5, wherein the composition is obtained by polymerizing ethylene in three consecutive reactor steps with at least one Ziegler catalyst, and optionally at a given reactor step in the presence of at least one comonomer which is an alpha-olefin.

7. The composition of claim 6 wherein the alpha-olefin is a C$_4$ to C$_{12}$ alpha-olefin.

8. A film comprising the polymer composition of claim 1.

9. The film according to claim 8 wherein the film is a blown film.

10. A process comprising extruding films comprising the polyethylene composition according to claim 1 wherein the film thickness is <1 mm thickness, and the composition has a melt flow rate at 5 kg/190° C. according to ISO (MI$_{5 kg}$) from 0.25 to 1 g/10 min and a Hostalen Index (HI) value of from 1.5 to 18.

11. The process according to claim 10, wherein for the extruded film comprising the polyethylene composition, the dart drop impact (DDI) is at least 300 g or higher at a film thickness of 10 μm as determined according to ASTM D1709: 2004 method A, and the DDI increases by at least 3%, when the film thickness decreases from 20 μm to 10 μm.

12. The process according to claim 11 wherein the DDI increases by at least 15% when the film thickness decreases from 20 μm to 10 μm.

* * * * *